A. HAAS.
MEAT AND VEGETABLE CUTTER.
APPLICATION FILED MAR. 26, 1910.
986,166.
Patented Mar. 7, 1911.
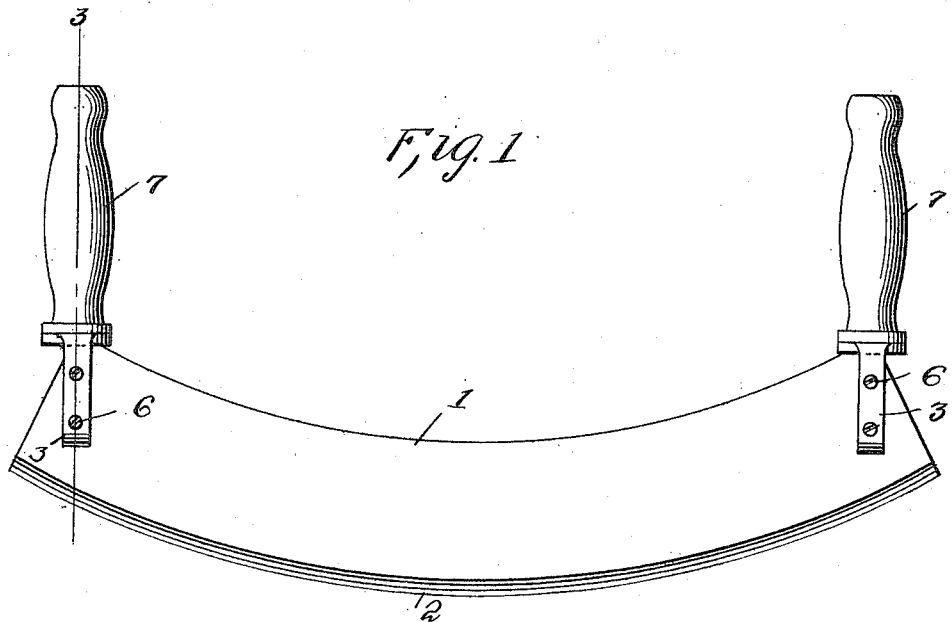
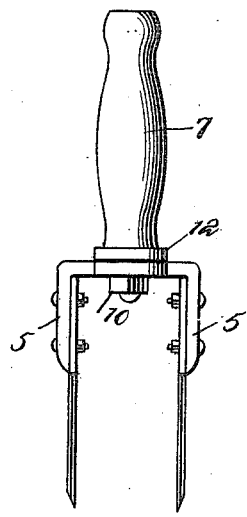
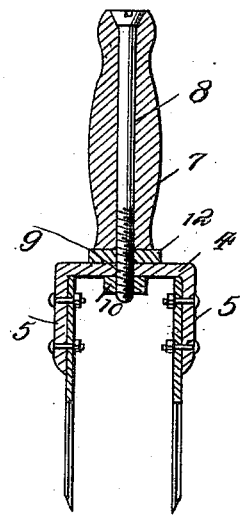
Witnesses
William Smith
C. C. Hines
Inventor
Albert Haas.
By Victor J. Evans
Attorney

UNITED STATES PATENT OFFICE.

ALBERT HAAS, OF LOUISVILLE, KENTUCKY.

MEAT AND VEGETABLE CUTTER.

986,166. Specification of Letters Patent. Patented Mar. 7, 1911.

Application filed March 26, 1910. Serial No. 551,699.

*To all whom it may concern:*

Be it known that I, ALBERT HAAS, a citizen of the United States, residing at Louisville, in the county of Jefferson and State of Kentucky, have invented new and useful Improvements in Meat and Vegetable Cutters, of which the following is a specification.

This invention relates to an improved meat and vegetable cutter, the object of the invention being to provide a simple and effective construction of cutter which may be operated by a rocking motion.

A further object of the invention is to provide a cutter of this character embodying a plurality of cutting blades and means for detachably connecting the blades so that any desired number may be employed and so that when those in use become dulled others may be substituted therefor.

The invention consists of the features of construction, combination and arrangement of parts hereinafter fully described and claimed, reference being had to the accompanying drawing, in which:—

Figure 1 is a side elevation of a meat and vegetable cutter embodying my invention. Fig. 2 is an end elevation of the same. Fig. 3 is a sectional view on the line 3—3 of Fig. 1.

The cutter comprises two or more parallel cutting blades 1, each being of segmental form or longitudinally curved on the arc of a true circle, and having a correspondingly shaped lower cutting edge 2.

The blades 1 are detachably connected at each end by a yoke 3 formed of an upper cross bar 4 and depending arms 5. As shown the upper convex edges and oblique edges of the blades converge to form upper corner portions. The cross bars extend transversely over the said upper corners of the ends of the blades and rest thereon, and the arms 5 depend upon the outer sides of the blades against which they bear. Bolts, screws, or other suitable fasteners 6 pass through the arms and blades and detachably unite them, so that if the blades should become dulled or injured in use they may be detached and others substituted therefor. By the use of a greater number of arms 5, it will be understood that any desired number of the blades may be employed. Carried by each yoke is a handle 7 of wood or other suitable material, through which handle extends a securing stem 8 threaded at its lower end for passage through a threaded opening 9 in the cross bar 4 and having applied thereto a retaining nut 10. The stem is formed at its upper end with a slotted head 11 which is countersunk in the upper end of the handle, and a washer 12 is provided which rests upon the cross bar 4 and against which the lower end of the handle abuts, whereby the latter is firmly clamped in position. By the use of the yokes, the body of each of which is formed of a single piece of material, the necessity of employing a number of connecting parts is avoided, greater strength and economy secured, and, as the cross bars of the yokes rest upon the upper corners of the blades and the integral arms are fastened to the blades, absolute rigidity is obtained and liability of the parts slipping or becoming loosened avoided. The two handles project upward from the opposite end of the cutter in parallel relation, and in the operation of the device these handles are grasped in the hands of the operator and the blades 2 rocked back and forth over the substance to be cut, which may be quickly and conveniently severed into strips or particles of the required size without the noise and fatigue resulting from the use of the ordinary chopping devices.

Having described my invention, I claim:—

A cutter of the character described comprising a plurality of parallel longitudinally curved cutting blades having lower convexly-curved cutting edges, upper concaved edges and oblique end edges converging to corners with said upper edges of the blades, yokes detachably uniting the blades at their ends, each yoke comprising a cross bar bearing upon the adjacent upper corner portions of the blades and having integral arms depending upon the outer sides of said blades, fastenings passing through each blade and the arms of the yokes bearing against the same, detachable stems secured to the cross bars of the yokes, and a handle carried by each detachable stem.

In testimony whereof I affix my signature in presence of two witnesses.

ALBERT HAAS.

Witnesses:
HERNDON CASTLEMAN,
DAYTON CASTLEMAN.

Copies of this patent may be obtained for five cents each, by addressing the "Commissioner of Patents, Washington, D. C."